United States Patent [19]

Kawabata et al.

[11] Patent Number: 5,525,684

[45] Date of Patent: Jun. 11, 1996

[54] PHENOLIC RESIN COMPOSITION

[75] Inventors: Tomoyuki Kawabata; Shigeru Iimuro; Teruo Yuasa, all of Aichi, Japan

[73] Assignee: Mitsui Toatsu Chemicals, Inc., Tokyo, Japan

[21] Appl. No.: 376,146

[22] Filed: Jan. 20, 1995

[30] Foreign Application Priority Data

Jan. 20, 1994 [JP] Japan .................... 6-004852

[51] Int. Cl.⁶ .............. C08L 61/06; C08L 61/10; C08L 61/04; C08L 63/02
[52] U.S. Cl. ................ 525/480; 525/481; 525/489; 525/491; 525/501; 525/523
[58] Field of Search ................. 525/480, 481, 525/489, 491, 501, 523

[56] References Cited

U.S. PATENT DOCUMENTS 5,395,915   3/1995   Iimuro, et al. ................... 528/137

FOREIGN PATENT DOCUMENTS 1-95124   4/1989   Japan .

OTHER PUBLICATIONS

Database WPI, Week 9141, Derwent Publications Ltd., London, GB; AN 91-298813 & JP-A-3197551 (Mitsui Toatsu Chemicals, Inc.) Aug. 28, 1991 *Abstract*

Database WPI, Week 9322, Derwent Publications, Ltd., London, GB; AN 93-177794 (Mitsui Toatsu Chemicals, Inc.) Apr. 27, 1993 *Abstract*.

Chemical Abstracts, vol. 120, No. 22, May 30, 1994, Columbus, Ohio, US; *Abstract* & JP-A-5320290 (Arakawa Chem. Ind.) Dec. 3, 1993.

*Primary Examiner*—W. Robinson H. Clark
*Attorney, Agent, or Firm*—Burns, Doane, Swecker & Mathis

[57] ABSTRACT

A phenolic resin composition comprises a mixture of 100 parts by weight of a phenol aralkyl resin and 5 to 60 parts by weight of a novolak type phenolic resin having a content of binuclear components of not more than 10% by area, and a content of trinuclear components of not less than 50% by area and a sum content of tri- and tetra-nuclear components of 75% by area based on the total novolak phenolic resin except for the binuclear components, and an epoxy-cured product obtained by curing an epoxy resin while using the phenolic resin composition as set forth in claim 1 as a curing agent. The phenolic resin composition has a low viscosity and, when it is used as a curing agent for epoxy resins, the resulting epoxy-cured product has a low water absorption rate, is excellent in resistance to moisture and has a high glass transition temperature as compared with the cured product obtained using a novolak type phenolic resin as a curing agent.

4 Claims, No Drawings

PHENOLIC RESIN COMPOSITION

BACKGROUND OF THE INVENTION (a) Field of the Invention

The present invention relates to a phenolic resin composition and an epoxy-cured product in which the composition is used as a curing agent. More specifically, the present invention relates to a phenolic resin composition which is useful as, for example, an intermediate for preparing epoxy resins used in, for instance, molding compounds for semiconductor devices, preparing laminate materials and paints and varnishes, or a curing agent for such epoxy resins, has a low viscosity and permits epoxy-cured products formed by curing an epoxy resin to be improved in heat resistance and resistance to moisture as well as an epoxy-cured product in which the composition is used as a curing agent.

(b) Description of the Prior Art

Phenolic compounds have been used as intermediates for preparing epoxy resins or used as curing agents for epoxy resins or the like in order to prepare heat resistant composite materials and heat resistant adhesives comprising such epoxy resins, diversity of such epoxy resins in their applications has recently become increasingly high and accordingly, they are industrially important materials. For this reason, it has been desired to impart more improved quality to epoxy-cured products.

Japanese Un-examined Patent Publication No. Hei 1-95124 proposes, as a curing agent for epoxy resins, a phenol aralkyl resin having a low molecular weight and a low viscosity. The phenol aralkyl resin has a low viscosity and is excellent in flow properties, but has an extremely low molecular weight. For this reason, it has a high content of binuclear components and causes brittle epoxy-cured products formed by curing an epoxy resin with the phenol aralkyl resin as a curing agent.

With the recent marked advancement of the electric electronic technology, there has been desired the development of a resin which is used in such a field and can ensure excellent quality even when it is used in a small amount. For instance, molding compounds for IC's and laminate materials require the use of resins having a lower viscosity and accordingly, it is important to decrease the viscosity thereof while maintaining the desired properties such as heat resistance and resistance to cracking.

SUMMARY OF THE INVENTION

Accordingly, an object of the present invention is to provide a phenolic resin composition whose viscosity is low and which permits epoxy-cured products formed by curing an epoxy resin to be improved in heat resistance and resistance to moisture as well as an epoxy-cured product in which the composition is used as a curing agent.

The inventors of this invention have conducted various studies to achieve the foregoing object, have found out that the foregoing object can effectively be accomplished through the use of a mixture of a phenol aralkyl resin and a novolak type phenolic resin having such a polynuclear component-distribution that the content of binuclear component is low, while that of trinuclear components is high.

The present invention thus relates to a phenolic resin composition which comprises a mixture of 100 parts by weight of a phenol aralkyl resin and 5 to 60 parts by weight of a novolak type phenolic resin having a content of binuclear components of not more than 10% by area, and a content of trinuclear components of not less than 50% by area and a sum content of tri- and tetra-nuclear components of not less than 75% by area based on the total novolak type phenolic resin except for the binuclear components.

According to another aspect of the present invention, there is provided an epoxy-cured product in which the foregoing phenolic resin composition is used as a curing agent.

DESCRIPTION OF THE PREFERRED EMBODIMENTS

The present invention will be explained in more detail below.

The phenol aralkyl resin used in the present invention is a resin obtained by condensing a phenol compound and an aralkyl compound through a Friedel-Crafts reaction and accordingly, also referred to as Friedel-Crafts resin.

The phenol aralkyl resin used in the present invention is prepared by mixing an aralkyl compound with a phenol compound in an amount ranging from 1.1 to 2.5 moles, preferably 1.5 to 2.0 moles per mole of the former and raising the temperature of the mixture per se in the presence of an acid catalyst to react these compounds at a temperature detailed below. After completion of the reaction, unreacted phenol inevitably remains in the reaction system and can be distilled away under vacuum to thus give a resin, i.e., the phenol aralkyl resin defined above.

The phenol compounds used in this reaction may be any compound having a phenolic hydroxyl group in the molecule and specific examples thereof include phenol; alkyl-substituted phenols such as o-cresol, p-cresol, m-cresol, 2,6-xylenol and p-tert-butylphenol; aromatic group-substituted phenols such as p-phenylphenol; and naphthols such as α-naphthol and β-naphthol.

The aralkyl compounds used in this reaction may be bivalent aromatic compounds which can undergo a condensation reaction and have substituents such as halomethyl group, hydroxymethyl group and alkoxymethyl group. Specific examples thereof are dihalomethyl aromatic compounds such as α, α'-dichloro-p-xylene, α, α'-dichloro-m-xylene and α, α'-dichloro-o-xylene; dihydroxymethyl aromatic compounds such as p-xylylene glycol; and dialkoxymethyl aromatic compounds such as α, α'-dimethoxy-p-xylene, α, α'-dimethoxy-m-xylene and α, α'-dimethoxy-o-xylene.

Examples of catalysts usable in the reaction include inorganic compounds such as stannic chloride, zinc chloride, ferric chloride, cupric chloride, cupric sulfate, mercurous sulfate, mercuric sulfate, mercurous chloride, mercuric chloride, silver sulfate, silver chloride and sodium hydrogen sulfate; sulfuric acid compounds such as sulfuric acid, monoethylsulfuric acid, dimethylsulfuric acid and diethylsulfuric acid; and organic sulfonic acids such as p-toluenesulfonic acid, p-phenolsulfonic acid and methanesulfonic acid. These catalysts may be used alone or in combination. In the present invention, it is preferred to use sulfuric acid compounds such as sulfuric acid, monoethylsulfuric acid, dimethylsulfuric acid and diethylsulfuric acid as a catalyst. The amount of the catalyst used in the reaction preferably ranges from 0.01 to 5% by weight on the basis of the total weight of the phenol compound and the aralkyl compound.

The reaction temperature is in general not less than 110° C. This is because if it is less than 110° C., the reaction proceeds at an extremely low rate. Moreover, the reaction temperature desirably ranges from about 130° to 240° C. in order to reduce the reaction time. The reaction time usually falls within the range of from 1 to 20 hours.

In addition, an organic solvent having a relatively high boiling point may, if necessary, be used. Examples thereof usable in the invention include alcohols such as methanol, ethanol, n-propanol, isopropanol, n-butanol and tert-butanol; and aromatic compounds such as toluene, xylene and mesitylene.

Then the novolak type phenolic resin used in the present invention will be detailed below.

The binuclear components present in the novolak type phenolic resin do not take part in a crosslinking reaction and therefore, the content thereof is preferably low. However, the viscosity of the resin decreases as the content of the binuclear components increases and thus the binuclear components may be present in such a content that the desired degree of crosslinking is not adversely affected. For this reason, the content of the binuclear components present in the resin is limited to not more than 10% by area in the present invention. It is further necessary that the content of trinuclear components is adjusted to not less than 50% by area on the basis of the total component of the resin except for the binuclear components in order to accomplish the intended object of the present invention. Moreover, the content of the sum of tri- and tetra-nuclear components present therein should be adjusted to not less than 75% by area on the basis of the total component of the resin except for the binuclear components.

An example of the method for preparing the novolak type phenolic resin used in the invention will be given below. First of all, phenols are mixed with a formaldehyde equivalent in an amount usually ranging from 4 to 30 times the molar amount of the formaldehyde equivalent (hereunder simply referred to as reaction molar ratio: "P/F"), then an acid catalyst is added to the resulting mixture and the mixture is subjected to a condensation reaction at a temperature usually ranging from 60° to 100° C. for 2 to 5 hours to give a primary condensate. Then the resulting primary condensate is heated up to a temperature usually ranging from about 150° to 160° C. under the atmospheric pressure to thus remove water and a small amount of phenols and then to a temperature usually ranging from about 160° to 180° C. under reduced pressure to remove unreacted phenols. Further the condensate can be distilled by raising the temperature to 220° to 250° C. under a reduced pressure usually ranging from 1 to 5 mm Hg in a device packed with a packing such as McMahon packing to thus give, as a bottom product, a novolak type phenolic resin having a low content of the binuclear components and a high content of the trinuclear components.

The phenols used as starting materials of the novolak type phenolic resin may be, for instance, cresol and o-, m- and p-alkyl-substituted phenols, in addition to phenol.

Examples of the formaldehyde equivalents are formalin, paraformaldehyde, hexamethylenetetramine, trioxane and cyclic formal.

Examples of acid catalysts usable herein are organic and inorganic acids such as hydrochloric acid, sulfuric acid, p-toluenesulfonic acid and oxalic acid.

To prepare the novolak type phenolic resin, the reaction molar ratio, P/F, is adjusted to not less than 4 and preferably not less than 8. The content of trinuclear and higher components can roughly be controlled by adjusting the foregoing reaction molar ratio in such a manner that it falls within the range defined above. The higher the reaction molar ratio, the higher the content of the trinuclear components in the resulting resin.

The content of the binuclear components may be controlled by adjusting the temperature and the pressure during the foregoing distillation procedure. The removal of the binuclear components may be carried out by extraction or steam distillation, in addition to the vacuum distillation discussed above. According to such extraction procedure, the removal of the binuclear components is carried out by, for instance, repeated washing with a poor solvent for the novolak type phenolic resin such as toluene or xylene, while the removal thereof through steam distillation is carried out by, for instance, distilling the reaction system under reduced pressure under blowing an inert gas or steam through the system.

In this respect, the binuclear components thus removed may be used as bisphenol F.

Novolak type phenolic resins prepared by the methods other than those discussed above may likewise be used in the present invention so far as they can satisfy the requirement for the distribution of the polynuclear components defined in the present invention.

The phenolic resin composition of the present invention can be obtained by admixing 100 parts by weight of the foregoing phenol aralkyl resin with 5 to 60 parts by weight of the novolak type phenolic resin defined above. Preferred are phenolic resin compositions obtained by admixing 100 parts by weight of the phenol aralkyl resin with 10 to 50 parts by weight and more preferably 20 to 40 parts by weight of the novolak type phenolic resin.

These ingredients may simply be pulverized together, but desirably they are admixed at a temperature higher than the softening points of these ingredients. However, the method for mixing these ingredients is not restricted to these specific ones and other methods can be used as long as they can ensure the formation of a uniform mixture.

The epoxy-cured product of the present invention can be produced by reacting the foregoing phenolic resin composition of the present invention with a well-known and currently used epoxy resin at a temperature usually ranging from 100° to 250 ° C. in the presence of a curing accelerator.

Such an epoxy resin usable herein may be any epoxy resin having at least two epoxy groups in the molecule and specific examples thereof include glycidyl ether type epoxy resins such as bisphenol A type epoxy resins, bisphenol F type epoxy resins, phenol novolak type epoxy resins, cresol novolak type epoxy resins and tetramethylbiphenyl type epoxy resins; and glycidyl ester type epoxy resins. These epoxy resins may be used alone or in any combination.

The amount of the phenolic resin composition used for preparing the cured product in general ranges from 20 to 150 parts by weight and preferably 30 to 120 parts by weight per 100 parts by weight of the epoxy resin.

Examples of such curing accelerators usable herein are organic phosphine compounds such as triphenyl phosphine; imidazole compounds such as 2-ethyl-4-methylimidazole; and bicyclic nitrogen atom-containing compounds such as 1,8-diazabicyclo(5,4,0)undec-7-ene. The amount of the curing accelerator to be added to the mixture of the ingredients usually ranges from 0.01 to 5% by weight and preferably 0.05 to 1% by weight on the basis of the total weight of the phenolic resin composition and the epoxy resin.

In addition, the epoxy-cured product of the present invention may comprise, if necessary, fillers such as silica, alumina, talc and clay; flame retarders such as antimony trioxide; coloring agents such as carbon black; flexibilizers such as acrylonitrile-butadiene rubber and silicone oil.

The present invention will hereinafter be described in more detail with reference to the following Preparation Examples, working Examples and Comparative Examples. In the following Examples, evaluation and determination of various characteristic properties were carried out according to the following methods (1) to (4).

(1) Contents of Polynuclear Components

The content (%) of each polynuclear component used herein is expressed in terms of "% by area" as determined by the gel permeation chromatography (column: G4000HXL+G2500HXL+G2000HXL×2 available from Tosoh Corporation; eluent: tetrahydrofuran; detector: differential refractometer).

(2) Viscosity

The viscosity of each sample was determined at 150° C. using ICI Cone & Plate Type Viscometer (available from Research Equipment Company, London).

(3) Glass Transition Temperature (Tg)

The Tg value of each sample was evaluated through the determination of linear thermal coefficient of expansion according to TMA (thermal mechanical analysis) using TMA 8146 available from Rigaku Co., Ltd.

(4) Relative Water Absorption Rate

The term "water absorption rate" herein means a boiling water absorption rate determined under boiling at 100° C./2 hours.

The water absorption rate is defined by the following relation: [(weight of cured product after water absorption—weight thereof prior to water absorption)/(weight of cured product after water absorption)]×100.

The term "relative water absorption rate" herein means a relative ratio of the water absorption rate of each sample to that of the sample prepared in Comparative Example 2.

<Preparation of Phenol Aralkyl Resin>

Preparation Example 1

Phenol (813.8 g, 8.66 moles), methanol (31.8 g) and diethylsulfuric acid (0.853 g) were introduced into a reactor provided with a condenser through which cooling water maintained at 70° C. was circulated and the temperature of the mixture was raised in an oil bath with stirring. The introduction of α, α'-dimethoxy-p-xylene was started at an instance when the temperature of the liquid in the reactor reached 140° C. After continuously introducing 800 g (4.81 moles) of α, α'-dimethoxy-p-xylene over 4 hours, the reaction mixture was ripened at a temperature of 140° C. for additional 90 minutes. Then the temperature of the system was raised up to 160° C. while the pressure in the reactor was reduced to remove unreacted phenol and to thus give 1025 g of a desired phenol aralkyl resin.

<Preparation of Novolak Type Phenolic Resin>

Preparation Example 2

To a 3000 ml volume reactor equipped with a stirring machine, a temperature-controlling device, a reflux condenser, a total condenser, a pressure reducing device or the like, there were added 2000 g of phenol and 287.5 g of a 37% aqueous solution of formalin followed by sufficient mixing of these ingredients (P/F=6), addition of 5.6 g of oxalic acid dihydrate and a condensation reaction of the ingredients at 70° C. for 4 hours. Then the mixture of the reaction products was heated up to 160° C. at atmospheric pressure to remove water and a small amount of phenol and further heated to 170° C. at 20 mm Hg to remove unreacted phenol. Thereafter, the mixture was additionally heated to 210° C. at 6 mm Hg to remove remaining phenol. Then the mixture was subjected to distillation by heating to a final temperature of 250° C. at a final pressure of 3 mm Hg in a device provided with McMahon packing having a diameter of 15 mm and a height of 20 mm to give a desired novolak type phenolic resin as a bottom product.

The content of each polynuclear component present in the resulting novolak type phenolic resin was determined according to the method discussed above and was found to be 2.5% by area for the binuclear components; and 62.0% by area for the trinuclear components and 85.5% by area for the sum of tri- and tetra-nuclear components on the basis of the amount of the resin except for the binuclear components.

<Phenolic Resin Composition>

Example 1

To a 500 ml volume, 4-necked separable flask equipped with a stirring machine, a thermometer, a pipe for nitrogen gas-introduction, there were charged 200 g of the phenol aralkyl resin prepared in Preparation Example 1 and 10 g of the novolak type phenolic resin prepared in Preparation Example 2 and the resulting mixture was stirred, in a molten state, for 10 minutes in an oil bath maintained at 140° C. to give a phenolic resin composition.

Example 2

To a 500 ml volume, 4-necked separable flask equipped with a stirring machine, a thermometer and a pipe for nitrogen gas-introduction, there were charged 200 g of the phenol aralkyl resin prepared in Preparation Example 1 and 20 g of the novolak type phenolic resin prepared in Preparation Example 2 and the resulting mixture was stirred, in a molten state, for 10 minutes in an oil bath maintained at 140° C. to give a phenolic resin composition.

Example 3

To a 500 ml volume, 4-necked separable flask equipped with a stirring machine, a thermometer and a pipe for nitrogen gas-introduction, there were charged 200 g of the phenol aralkyl resin prepared in Preparation Example 1 and 40 g of the novolak type phenolic resin prepared in Preparation Example 2 and the resulting mixture was stirred, in a molten state, for 10 minutes in an oil bath maintained at 140° C. to give a phenolic resin composition.

Example 4

To a 500 ml volume, 4-necked separable flask equipped with a stirring machine, a thermometer and a pipe for nitrogen gas-introduction, there were charged 200 g of the phenol aralkyl resin prepared in Preparation Example 1 and 60 g of the novolak type phenolic resin prepared in Preparation Example 2 and the resulting mixture was stirred, in a molten state, for 10 minutes in an oil bath maintained at 140° C. to give a phenolic resin composition.

Example 5

To a 500 ml volume, 4-necked separable flask equipped with a stirring machine, a thermometer and a pipe for nitrogen gas-introduction, there were charged 200 g of the phenol aralkyl resin prepared in Preparation Example 1 and 80 g of the novolak type phenolic resin prepared in Preparation Example 2 and the resulting mixture was stirred, in a molten state, for 10 minutes in an oil bath maintained at 140° C. to give a phenolic resin composition.

Example 6

To a 500 ml volume, 4-necked separable flask equipped with a stirring machine, a thermometer and a pipe for nitrogen gas-introduction, there were charged 200 g of the phenol aralkyl resin prepared in Preparation Example 1 and 100 g of the novolak type phenolic resin prepared in Preparation Example 2 and the resulting mixture was stirred, in a molten state, for 10 minutes in an oil bath maintained at 140° C. to give a phenolic resin composition.

Example 7

To a 500 ml volume, 4-necked separable flask equipped with a stirring machine, a thermometer and a pipe for nitrogen gas-introduction, there were charged 200 g of the phenol aralkyl resin prepared in Preparation Example 1 and 120 g of the novolak type phenolic resin prepared in Preparation Example 2 and the resulting mixture was stirred, in a molten state, for 10 minutes in an oil bath maintained at 140° C. to give a phenolic resin composition.

Comparative Example 1

Comparative Sample 1 simply comprised the phenol aralkyl resin prepared in Preparation Example 1.

Comparative Example 2

Comparative Sample 2 simply comprised the novolak type phenolic resin prepared in Preparation Example 2.
<Preparation of Epoxy-Hardened Product>

An epoxy resin, a curing accelerator and each of the phenolic resin compositions prepared in Examples 1 to 7 and Comparative Samples 1 and 2 as a curing agent were dissolved in a possible minimum amount of acetone and formed into a cast resin plate having a thickness of about 2 mm which was used as a sample for property-evaluation. The relative amounts of the curing agent and the curing accelerator were set at 49 parts by weight and one part by weight, respectively, per 100 parts by weight of the epoxy resin. The epoxy resin used as the principal ingredient was o-cresol novolak type epoxy resin (EOCN-102S, available from Nippon Kayaku Co., Ltd.) and 2E4MZ (an imidazole compound available from Shikoku Kasei Chemicals Corporation) was used as the curing accelerator. The curing procedure was performed at 175° C. for 5 hours.

The viscosities of the phenolic resin compositions prepared in Examples 1 to 7 and the resins of Comparative Examples 1 and 2 and the Tg values and the relative water absorption rates of the resulting epoxy-cured products are listed in Table 1 given below.

TABLE 1

| Sample | Viscosity (Poise) | Tg(°C.) | Relative Water Absorption Rate |
| --- | --- | --- | --- |
| Ex. 1 | 3.18 | 187 | 0.82 |
| Ex. 2 | 2.85 | 189 | 0.83 |
| Ex. 3 | 2.26 | 195 | 0.84 |
| Ex. 4 | 1.97 | 198 | 0.85 |
| Ex. 5 | 1.69 | 195 | 0.86 |
| Ex. 6 | 1.50 | 193 | 0.87 |
| Ex. 7 | 1.20 | 193 | 0.88 |
| Comp. Ex. 1 | 3.61 | 186 | 0.81 |
| Comp. Ex. 2 | 0.19 | 193 | 1.00 |

As has been discussed above in detail, the phenolic resin composition of the present invention has a low viscosity on the order of 1.0 to 3.2 poises and, when the composition is used as a curing agent for epoxy resins, the resulting epoxy-cured products each has a low water absorption rate, is excellent in resistance to moisture and has a high glass transition temperature (ranging from 187° to 200° C.) as compared with the cured product obtained using a novolak type phenolic resin as a curing agent.

What is claimed is:

1. A phenolic resin composition comprising a mixture of 100 parts by weight of a phenol aralkyl resin and 10 to 50 parts by weight of a novolak phenolic resin having a content of binuclear components of not more than 10% by area, and a content of trinuclear components of not less than 50% by area and a sum content of tri- and tetra-nuclear components of 75% by area based on the total novolak phenolic resin except for the binuclear components.

2. An epoxy-cured product obtained by curing an epoxy resin while using, as a curing agent, a phenolic resin composition comprising a mixture of 100 parts by weight of a phenol aralkyl resin and 10 to 50 parts by weight of a novolak phenolic resin having a content of binuclear components of not more than 10% by area, and a content of trinuclear components of not less than 50% by area and a sum content of tri- and tetra-nuclear components of 75% by area based on the total novolak phenolic resin except for the binuclear components.

3. A phenolic resin composition according to claim 1, wherein the composition comprises 20 to 40 parts by weight of the novolak phenolic resin.

4. An epoxy-cured product according to claim 2, wherein the phenolic resin composition comprises 20 to 40 parts by weight of the novolak phenolic resin.

\* \* \* \* \*